United States Patent
Higgins et al.

(10) Patent No.: US 6,896,145 B2
(45) Date of Patent: May 24, 2005

(54) DISPENSING RACK WITH HIGH DEFINITION LIQUID CRYSTAL DISPLAY HEADER

(75) Inventors: Charles T. Higgins, Richmond, VA (US); Thomas M. Garguilo, New York, NY (US); Kristin T. Spencer, Richmond, VA (US); Thomas A. Katzenmeyer, New York, NY (US); William R. Sweeney, Richmond, VA (US)

(73) Assignee: Philip Morris Incorporated, New York, NY (US)

( * ) Notice: Subject to any disclaimer, the term of this patent is extended or adjusted under 35 U.S.C. 154(b) by 48 days.

(21) Appl. No.: 10/371,304

(22) Filed: Feb. 21, 2003

(65) Prior Publication Data

US 2003/0172563 A1 Sep. 18, 2003

Related U.S. Application Data

(60) Provisional application No. 60/358,846, filed on Feb. 22, 2002.

(51) Int. Cl.[7] .................................................. A47F 7/00
(52) U.S. Cl. ......................................................... 211/1
(58) Field of Search ........................... 211/1, 49.1, 59.2, 211/1.51; 345/1.1, 1.2, 2.1; 340/825.35

(56) References Cited

U.S. PATENT DOCUMENTS

| | | | | |
|---|---|---|---|---|
| 2,775,352 A | * | 12/1956 | Waite ........................... 108/106 |
| 4,002,886 A | * | 1/1977 | Sundelin ....................... 235/383 |
| 4,500,880 A | * | 2/1985 | Gomersall et al. .......... 340/5.91 |
| 5,042,686 A | * | 8/1991 | Stucki ............................ 221/13 |
| 5,091,713 A | * | 2/1992 | Horne et al. ................. 340/541 |
| 5,111,196 A | * | 5/1992 | Hunt ........................... 340/5.91 |
| 5,273,183 A | * | 12/1993 | Tuttobene ........................ 221/7 |
| 5,632,010 A | * | 5/1997 | Briechle et al. .............. 345/1.1 |
| 5,636,750 A | * | 6/1997 | Heyl ........................... 211/1.57 |
| 5,641,050 A | * | 6/1997 | Smith et al. ................. 194/210 |
| 5,663,746 A | * | 9/1997 | Pellenberg et al. .......... 345/581 |
| 5,819,981 A | * | 10/1998 | Cox ............................... 221/2 |
| 5,927,544 A | * | 7/1999 | Kanoh et al. .................. 221/90 |
| 5,947,302 A | * | 9/1999 | Miller ........................ 211/49.1 |
| 6,139,357 A | | 10/2000 | Shih |
| 6,175,517 B1 | | 1/2001 | Jigour et al. |
| 6,193,085 B1 | | 2/2001 | Nook et al. |
| 6,278,437 B1 | | 8/2001 | Iga et al. |
| 6,292,595 B1 | | 9/2001 | Petteruti et al. |
| D449,835 S | | 10/2001 | Ohtani |
| 6,310,647 B1 | | 10/2001 | Parulski et al. |
| 6,313,400 B1 | | 11/2001 | Mosquera et al. |
| 6,539,282 B2 | * | 3/2003 | Metcalf et al. .............. 700/237 |

* cited by examiner

*Primary Examiner*—Hugh B. Thompson, II
*Assistant Examiner*—Sarah Purol
(74) *Attorney, Agent, or Firm*—Connolly Bove Lodge & Hutz LLP

(57) ABSTRACT

A point-of-sale dispensing rack for retail consumer goods includes a high definition liquid crystal display header system for showing a variety of preprogramable picture and/or written messages over an extended period of time. The system includes a high definition liquid crystal display header and a portable memory storage device housing for receiving a portable memory storage device with preprogramable messages thereon. A computer connected between the portable memory storage device housing and the header sends the messages to the header for display. The system allows for periodic automatic rotation of several messages e.g. throughout the day and month versus paper graphics that must be changed by hand. The system also enables programming of messages at different times or dates which enhances the ability of a brand of a particular consumer product to reach its unique audience. The system is also capable of being networked to provide coordination of displays and the updating of messages and images stored in the memory.

20 Claims, 1 Drawing Sheet

Fig. 1.
Fig. 2.
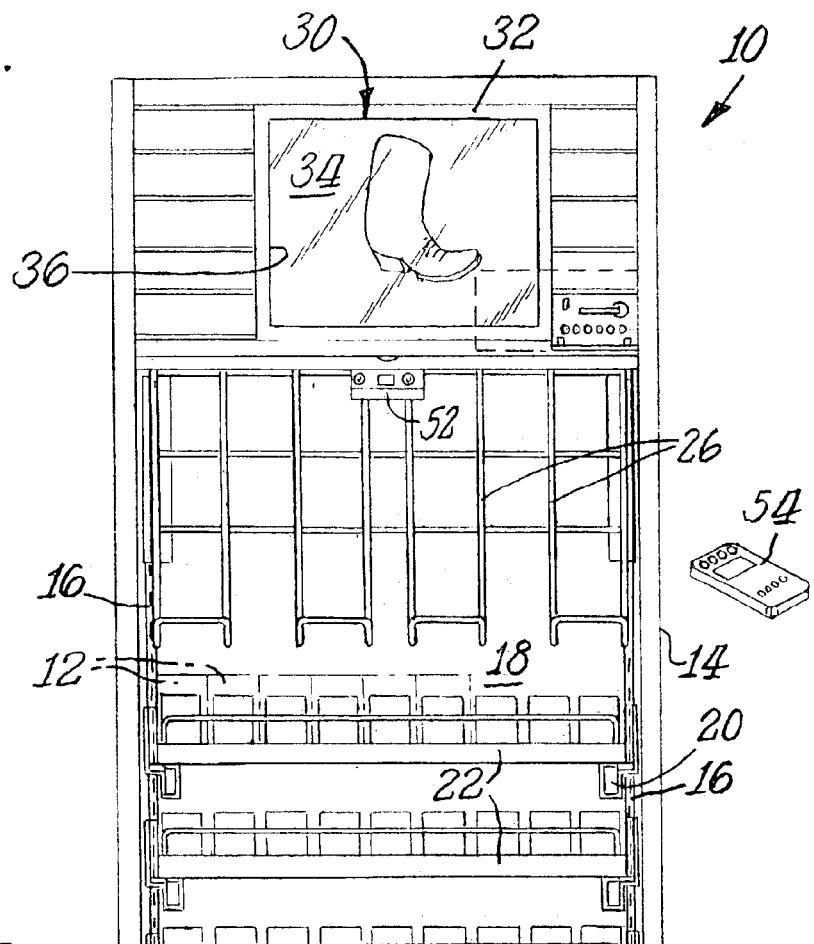
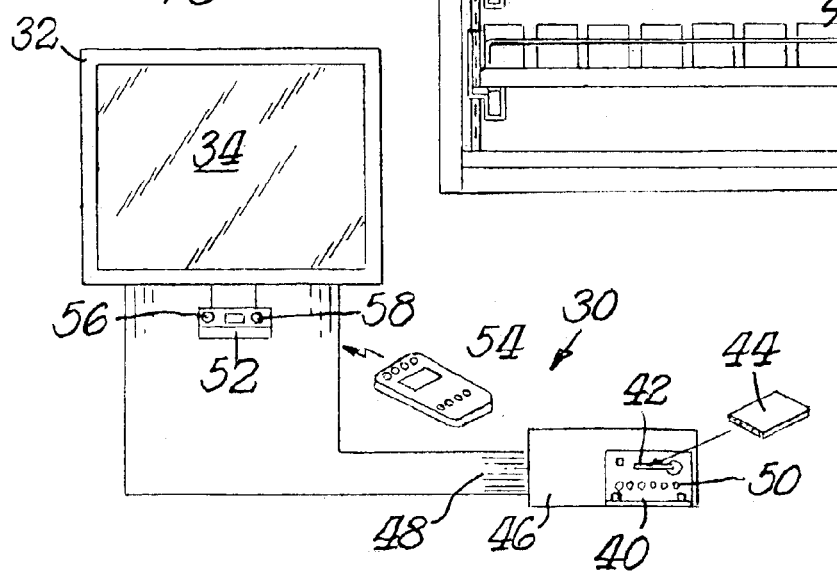

DISPENSING RACK WITH HIGH DEFINITION LIQUID CRYSTAL DISPLAY HEADER

This application claims the benefit of Provisional Application No. 60/358,846, filed Feb. 22, 2002.

BACKGROUND OF THE INVENTION

The present invention relates to a point-of-sale dispensing rack for storing and dispensing retail consumer goods, such as cigarette packs, and more particularly to a display rack having a high definition liquid crystal display header system for automatically showing numerous programmable visual messages over extended periods of time.

Dispensing racks are frequently used in a variety of commercial retail environments in order to support and simultaneously display a variety of consumer goods. These dispensing racks are a common fixture in grocery stores, drug stores, department stores and other similar retail establishments as they provide a space effective means of supporting and advertising certain products. Such racks may be equipped to hold one or more types of product in a variety of different orientations. Some of the products frequently promoted and dispensed from these dispensing racks include photographic film, cassette tapes, videocassettes, and especially tobacco products, and in particular packs and cartons of cigarettes.

The prior art includes a wide variety of dispensing rack configurations. For example, U.S. Pat. No. 6,193,085, granted Feb. 27, 2001, discloses a dispensing rack that comprises a back panel joined to a pair of side panels by a pair of corner brackets, and a variety of shelf configurations, each of which enables products to be supported in a different orientation. Each corner bracket is formed with a channel dimensioned to accept an upright support therein. Each shelf configuration is provided with a pair of side support flanges having a plurality of fingers which are received by the apertures of the upright supports to thereby secure the shelves within the interior of the dispensing rack. A header member attached to the top region of the rack is provided with a translucent strip of material with lighting behind the strip material which attracts consumers' attention to the products positioned within the interior. A top cover has an upwardly arched surface to thereby prevent product from being placed thereon. Nesting of the upright supports within the interior of the corner brackets permits the entire interior of the rack to be utilized to support and display product.

Although the dispensing rack of U.S. Pat. No. 6,193,085 includes a header assembly to attract consumers' attention to the products positioned within the interior of the dispensing rack, the assembly merely comprises a stationary signage sheet and a transparent cover with appropriate background lighting. The signage sheet is translucent and contains fixed advertising indicia preferably of the particular owner or operator of the dispensing rack. The advertising indicia remains the same until a new signage sheet is physically substituted for the existing sheet.

SUMMARY OF THE INVENTION

Among the objects of the present invention is a point-of-sale dispensing rack having a high definition liquid crystal display header system for automatically showing a plurality of programmable picture and/or written messages over an extended period of time.

Another object of the present invention is a point-of-sale dispensing rack with an automated high definition liquid crystal display system that provides precise execution of promotional messaging without excessive sales support overhead.

Still another object of the present invention is a retail product dispensing rack with a high definition liquid display system that maximizes brand presence of the retail products within the rack and optimizes brand portfolio support through rotation of a variety of brand messages.

In accordance with the present invention, a point-of-sale dispensing rack for retail consumer goods has a high definition display system that includes a liquid crystal display header connected to the dispensing rack. The display system also includes a portable memory storage device housing for receiving a portable memory storage device containing a variety of preprogramable written and/or picture messages as well as the memory device. A computer connected between the display header and the housing transmits written and/or picture messages from the portable memory storage device to the high definition liquid crystal display header on the dispensing rack.

A communications medium (network) may be connected to the computer to allow updates to the memory storage device as well as to provide for the passage of coordination signals between multiple display headers.

BRIEF DESCRIPTION OF THE DRAWINGS

Novel features and advantages of the present invention in addition to those mentioned above will become apparent to persons of ordinary skill in the art from a reading of the following detailed description in conjunction with the accompanying drawings wherein similar reference characters refer to similar parts and in which:

FIG. 1 is a front elevational view of a point-of-sale dispensing rack for retail consumer goods and a high definition liquid crystal display header system, in accordance with the present invention; and FIG. 2 is a schematic diagrammatic view of the high definition liquid crystal display system.

DETAILED DESCRIPTION OF THE INVENTION

Referring in more particularly to the drawings, FIG. 1 illustrates a point-of-sale dispensing rack 10 for holding and attractively displaying retail consumer goods such as packs of cigarettes 12. Although cigarette packs are illustrated, the dispensing rack 10 is equally suitable for other consumer goods such as candy bars and other snacks, photographic film, cassette tapes and videotapes, for example. Fundamentally, the dispensing rack 10 comprises an enclosure 14 fully open at the front thereof with a pair of spaced apart upright channels 16 secured to a back panel 18 of the enclosure. Cantilevered shelf supporting brackets 20 connected to the upright channels 16 function to support horizontal shelf frames 22 upon which cigarette packs 12 are positioned. Spring loaded pushers 24 operate to maintain the cigarette packs at the front of the dispensing rack. Removable angled display shelves 26 are also connected to the upright channels 16. Display rack 10 is shown and described in U.S. Pat. No. 6,193,085, granted Feb. 27, 2001, which patent is incorporated herein by reference in its entirety for all useful purposes.

Dispensing rack 10 also includes a high definition liquid crystal display header system 30 that includes a liquid crystal display header 32 with a flat screen 34 positioned within an appropriately dimensioned compartment 36 at the top region of the rack. Liquid crystal displays provide high definition viewing of picture and/or written messages. U.S. Pat. No. 6,278,437, granted Aug. 21, 2001, illustrates and describes a liquid crystal display apparatus, which patent is incorporated herein by reference in its entirety for all useful purposes.

System 30 of the present invention also includes a portable memory storage device housing in the form of a compact flash card housing 40 with an opening 42 for a portable memory storage device such as a compact flash card 44. The flash card contains the picture and/or written messages for viewing on the flat screen 34 of the liquid crystal display header 32. The flash card is preprogrammed with the messages to be viewed on the flat screen of the header as well as with a schedule of time and dates for displaying of those messages. The schedules and messages are encrypted with an non-reversible algorithmic public key encryption system such as those known as the Data Encryption Standard (DES) or by RSA or others. This encryption allows the invention to display only those messages and schedules which are genuine as well as prevent the theft of messages and schedules by others. Compact flash cards and flash card housings are known in the art such as shown and described in U.S. Pat. No. 6,313,400, granted Nov. 6, 2001, U.S. Pat. No. 6,139,357, granted Oct. 31, 2000, U.S. Pat. No. 6,175,517, granted Jan. 16, 2001, U.S. Pat. No. 6,310,647, granted Oct. 30, 2001, U.S. Pat. No. 6,292,595, granted Sep. 18, 2001, and D449,835, granted Oct. 30, 2001, which patents are incorporated herein by reference in their entirety for all useful purposes.

Other types of portable memory storage devices include "Smart Media" Memory Stick® by Sony, Micro Devices by IBM and Multimedia Cards, for example.

A computer 46 including appropriate software is connected by wiring 48 between the compact flash card housing 40 and the high definition liquid crystal display header 32. Overall the computer functions to control the delivery of the picture and/or written messages stored on the compact flash card 44 to the flat screen of the header over extended periods of time. Additionally, the compact flash card housing 40 may include manual control buttons 50 which may be operated to achieve access to different messages stored on the compact flash card.

The computer 46 may also include network communication hardware and software to allow the remote reading and writing of the memory device as well as provide time coordination between separate displays in a store so that all images change simultaneously in a visually pleasing fashion. This network connection can be of the wired Ethernet variety using standard transaction control protocol/internet protocol (TCP/IP) or of wireless varieties such as using the IEEE 802.11b standard. Additional wired or wireless network connection technologies such as IEEE-1394, USB, IEEE-802.11x, WPAN, or IRDA can be used.

Messages to the retail manager or retail stocking personnel can be transmitted to the display computer over the network and/or pre-stored in the memory and displayed when desired. These messages can contain information to assist in cigarette merchandising such as graphical plan-o-grams showing the optimal placement of various brands of cigarettes within the merchandiser or information on promotions and sales policies and agreements.

The high definition liquid crystal display header system 30 also includes a remote control receiver 52 on the dispensing rack 10 and a hand held remote control 54. The receiver has on and off lights 56, 58 for indicating whether the system is in an on or off mode. The remote control may be used to turn the system on or off, and also to change the message being viewed on the header 32 by actuation of the buttons on the remote. Access to the retailer specific communications messages such as plan-o-grams may also be controlled by the remote.

Preferably, as noted above the messages and schedules are encrypted to prevent display of unauthorized messages and to prevent theft of messages and schedules. Also, an internally stored default message is displayed when no portable memory storage device is inserted in the housing. An encrypted log may be stored in the portable memory storage device as to which messages which were actually displayed and at what time for audit purposes. The log may be transmitted to a remote host for review via the network connection. The log may be served by the local computer as a secure webservice or web page for remote viewing by authorized browsers and systems.

The overall system may include a plurality of geographically widely separated dispensing racks where each dispensing rack has an unique ID and where messages may be encoded with a table of ID's to control whether the message is either displayed or skipped depending on the unique ID of a particular rack. The comparison of message ID to dispensing rack ID for decision as to whether or not to display a message may be accomplished with boolean or fuzzy logic. The unique identifiers of the dispensing rack may be either a single parameter or multiple parameters representing various attributes of the rack such as location and model, for example.

It should be understood that the above detailed description while indicating preferred embodiments of the invention are given by way of illustration only since various changes and modifications within the spirit and scope of the invention will become apparent to those skilled in the art from the detailed description.

What is claimed is:

1. A point-of-sale dispensing rack having shelving for holding and displaying retail consumer goods, and a high definition liquid crystal display header system connected to the dispensing rack, the system including:
   a high definition liquid crystal display header at a top region of the dispensing rack above the shelving;
   a portable memory storage device housing for receiving a portable memory storage device;
   a portable memory storage device containing a variety of preprogramable messages as well as a schedule for displaying same;
   a computer connected between the header and the portable memory storage device housing for transmitting messages on the portable memory storage device within the housing to the liquid crystal display header on the dispensing rack; and
   a remote control receiver on the dispensing rack.

2. The combination of claim 1 further including a hand held remote control constructed and arranged to remotely activate and inactivate the display header system as well as change the message viewed on the liquid crystal display header.

3. The combination of claim 1 wherein an internally stored default message is displayed when no portable memory storage device is inserted in the housing.

4. A point-of-sale dispensing rack having shelving for holding and displaying retail consumer goods, and a high definition liquid crystal display header system connected to the dispensing rack, the system including:

a high definition liquid crystal display header at a top region of the dispensing rack above the shelving;

a portable memory storage device housing for receiving a portable memory storage device;

a portable memory storage device containing a variety of preprogramable messages as well as a schedule for displaying same;

a computer connected between the header and the portable memory storage device housing for transmitting messages on the portable memory storage device within the housing to the liquid crystal display header on the dispensing rack; and wherein the messages and schedules are encrypted to both prevent display of unauthorized messages and to prevent theft of messages and schedules.

5. The combination of claim 4 wherein an internally stored default message is displayed when no portable storage device is inserted in the housing.

6. The combination of claim 4 including a network connected to the computer for changing the messages of the portable memory storage device.

7. The combination of claim 4 including a network connected to the computer for changing the messages of the portable memory storage device.

8. A point-of-sale dispensing rack having shelving for holding and displaying retail consumer goods, and a high definition liquid crystal display header system connected to the dispensing rack, the system including:

a high definition liquid crystal display header at a top region of the dispensing rack above the shelving;

a portable memory storage device housing for receiving a portable memory storage device;

a portable memory storage device containing a variety of preprogramable messages as well as a schedule for displaying same;

a computer connected between the header and the portable memory storage device housing for transmitting messages on the portable memory storage device within the housing to the liquid crystal display header on the dispensing rack; and wherein an encrypted log is stored in the portable memory storage device as to which messages were actually displayed at what time.

9. The combination of claim 6 including a network connected to the computer for changing the messages of the portable memory storage device.

10. The combination of claim 8 including a network connected to the computer for changing the messages of the portable memory storage device.

11. A point-of-sale dispensing rack having shelving for holding and displaying retail consumer goods, and a high definition liquid crystal display header system connected to the dispensing rack, the system including:

a high definition liquid crystal display header at a top region of the dispensing rack above the shelving;

a portable memory storage device housing for receiving a portable memory storage device;

a portable memory storage device containing a variety of preprogramable messages as well as a schedule for displaying same;

a computer connected between the header and the portable memory storage device housing for transmitting messages on the portable memory storage device within the housing to the liquid crystal display header on the dispensing rack; and a plurality of geographically widely separated dispensing racks where each dispensing rack has a unique identification and where messages are encoded with a table of identification to control whether the message is either displayed or skipped depending on the unique identification of the particular rack.

12. The combination of claim 11 wherein comparison of message identification to dispensing rack identification for decision as to whether or not to display a message is accomplished by boolean or fuzzy logic.

13. The combination of claim 12 wherein the unique identification of the dispensing rack is a single or multiple parameter representing various attributes of the rack.

14. The combination of claim 13 wherein the attributes of the rack comprise location and model.

15. The combination of claim 11 including a network connected to the computer for coordination and timing of messages at the plurality of dispensing racks.

16. The combination of claim 11 including a network connected to the computer for transmitting to a remote host a log stored in the portable memory storage device of messages actually displayed and the time such messages were actually displayed.

17. The combination of claim 11 including a network connected to the computer for changing the messages of the portable memory storage device.

18. The combination of claim 11 including a network connected to the computer for changing the messages of the portable memory storage device.

19. A point-of-sale dispensing rack having shelving for holding and displaying retail consumer goods, and a high definition liquid crystal display header system connected to the dispensing rack, the system including:

a high definition liquid crystal display header at a top region of the dispensing rack above the shelving;

a portable memory storage device housing for receiving a portable memory storage device;

a portable memory storage device containing a variety of preprogramable messages as well as a schedule for displaying same;

a computer connected between the header and the portable memory storage device housing for transmitting messages on the portable memory storage device within the housing to the liquid crystal display header on the dispensing rack; and a network connected to the computer for changing the display schedule of the portable memory storage device.

20. The combination of claim 19 including a network connected to the computer for changing the or picture messages of the portable memory storage device.

* * * * *